United States Patent [19]

Fraser et al.

[11] Patent Number: 5,272,697
[45] Date of Patent: Dec. 21, 1993

[54] APPARATUS AND METHOD FOR TIME MULTIPLEXING A RESOURCE AMONG A PLURALITY OF ENTITIES

[75] Inventors: Alexander G. Fraser, Bernardsville; Charles R. Kalmanek, Hoboken, both of N.J.; Srinivasan Keshav, Berkeley, Calif.

[73] Assignee: AT&T Bell Laboratories, Murray Hill, N.J.

[21] Appl. No.: 484,153

[22] Filed: Feb. 23, 1990

[51] Int. Cl.⁵ .............................................. H04J 3/17
[52] U.S. Cl. ...................................... 370/61; 370/80
[58] Field of Search .................. 370/60, 94.2, 85.6, 370/79, 80, 82, 84, 61, 60.1

[56] References Cited

U.S. PATENT DOCUMENTS

| | | | |
|---|---|---|---|
| 4,780,870 | 10/1988 | McHarg et al. | 370/60 |
| 4,797,880 | 1/1989 | Bussey, Jr. et al. | 370/60 |
| 4,897,874 | 1/1990 | Lidinsky et al. | 370/60 |
| 4,942,574 | 7/1990 | Zelle | 370/85.6 |
| 5,023,780 | 6/1991 | Brearley | 370/94.2 |
| 5,050,161 | 9/1991 | Golestani | 370/85.6 |

OTHER PUBLICATIONS

Schwartz, Mischa, Telecommunications Networks, Addison-Wesley, 1987, pp. 670-674, 686-689.
Zhang, Lixia, "A New Architecture for Packet Switching Network Protocols", Doctoral Thesis, MIT Laboratory for Computer Science, 1989, pp. 49-52.
Morgan, S. P., "Queuing Disciplines and Passive Congestion Control in Byte-Stream Networks", Proc. IEEE Infocom '89, Apr. 1989, pp. 712-714.
Fraser, Alexander G., "Towards a Universal Data Transport System", IEEE Journal on Selected Areas in Communications, vol. SAC-1, No. 5, Nov. 1983, pp. 810-812.

Primary Examiner—Douglas W. Olms
Assistant Examiner—Melvin Marcelo
Attorney, Agent, or Firm—Gordon E. Nelson

[57] ABSTRACT

Apparatus and methods for time multiplexing a resource among a plurality of entities at average rates and with deterministic delays between accesses to the resource by an entity. An entity accessing the resource receives a time slot on the resource; a fixed number of time slots constitute a frame. Each entity receives a fixed allocation of time slots in the frame. When an entity has work for the resource to do, it receives access to the resource for a number of slots in each frame equal to the lesser of the number of slots required to do the work and the number of slots in the allocation. A rate-controlled server is disclosed which defines a frame and allocations therein, as well as a hierarchy of servers which combines rate-controlled traffic with best effort traffic. In the hierarchy, a rate-controlled server activates a round-robin server when the entities served by the rate-controlled server do not require all the slots in a frame. A hierarchy of rate-controlled servers is further disclosed which permits access to the resource at widely-differing average rates. In that hierarchy, a number of slots in the frame for a given member of the hierarchy are reserved for the next member down of the hierarchy and the next member down is active only during those slots. Further disclosed are nodes of ISDN networks employing ATM which incorporate the servers and hierarchies thereof.

41 Claims, 6 Drawing Sheets

FCTR = 14
RCVC 0 NS = 5; NC = 3; CACTR = 3; FCTR = 14
RCVC 1 NS = 6; NC = 8; CACTR = 6; FCTR = 11
RCVC 2 NS = 3; NC = 0;                FCTR = 5
  BEVC(a): 5 CELLS
  BEVC(b): 1 CELL
  BEVC(c): 1 CELL

APPARATUS AND METHOD FOR TIME MULTIPLEXING A RESOURCE AMONG A PLURALITY OF ENTITIES

TECHNICAL FIELD

The invention disclosed in this application relates generally to time multiplexing a resource among a plurality of entities and specifically to time multiplexing when the entities have a wide variety of requirements.

BACKGROUND OF THE INVENTION

1. Field of the Invention

The capacity of devices such as computers and transmission lines has long been shared among a set of users by time multiplexing such devices among the users. When the device is time multiplexed, each user receives use of the device for a relatively short interval of time in turn. A user continues to receive use for intervals of time in turn until the task he wishes the device to perform for him is finished. Various techniques have been developed for such time multiplexing. Goals of such techniques typically include the following:

- Efficient use of the device;
- Provision of priorities for use of the device among the users;
- Providing for a fair allocation of the use of the device among the users;
- Protecting other users from a malicious or malfunctioning user.
- Guaranteeing the rate of service and the amount of delay between accesses. Achieving these goals has become more difficult as the capacities of the devices have increased and the range of needs of the users has broadened. For example, users of a single time-multiplexed data transmission line may be simultaneously employing the line to carry information ranging from digitized video signals through digitized voice signals to interactive commands to and responses from a computer program to file transfers to electronic mail.

2. Description of the Prior Art

One useful technique for multiplexing is the round-robin server. A block diagram of such a server is shown in FIG. 1. Round-robin server 101 provides the use of time multiplexed resource 103 to a number of entities. For example, if time multiplexed resource 103 is a computer, the entities may be processes running on the computer; if it is a transmission line, the entities may be virtual circuits which are using the transmission line. Whenever an entity has work for resource 103 to do, there is a single entry 113 for the entity on work list 111. Work list 111 is a queue with a head and tail. If an entity has work for resource 103 to do and there is presently no entry 113 for the entity on work list 111, an entry for the entity is placed at the tail of work list 111.

Provider 105 multiplexes resource 103 among the entities by reading from the head of work list 111. It takes the entry 113 currently at the head of work list 111 and provides the entity specified in entry 113 with a fixed amount of time on resource 103. When the time is expired, Provider 105 determines whether there is more work to do for the entity. If there is, the entry 113 is returned to the tail of work list 111; if not, it is removed from list 111. The above steps are repeated for each entry 113 on the list. If work 111 is empty, resource 103 simply idles.

Since every entity using the resource has only a single entry on work list 111 and each entry represents a fixed quantity of access to resource 103, round-robin server 101 can guarantee a minimum level of service: if there are n entities being served by server 101, each entity will receive at least 1/n of the total access to resource 103 and the time between accesses by the entity will be at most n*(the interval of time given each entity)

Round robin server 101 can, however, make no guarantees regarding any level of service above the minimum level, even though entities will on the average receive more and more frequent access. The reason for this is that actual access above the guaranteed minimum for a given entity is a function of the amount of access required by the other entities.

An example of an area in which a round-robin server like that of FIG. 1 is not adequate is a broadband integrated services digital network (ISDN). Such a network carries many classes of traffic, including digitized video and audio and computer traffic. Broadband ISDN transfers data using a technique called asynchronous transfer mode (ATM). In ATM, all data is transferred in cells. A cell has a header, containing information which the network requires to deliver the cell to its destination via a virtual circuit, and a body containing the data to be transferred via the virtual circuit. FIG. 2 shows a cell 201 as defined for use in ATM networks. Cell 201 is 53 bytes long; 48 of the bytes are body 205; the remaining five bytes are header 203.

While all data in a broadband ISDN moves in cells, the kind of data being carried in the cell 201 necessarily influences the manner in which the cell is dealt with by the ISDN. Different classes of data have different requirements as regards bandwidth (the amount of data carried over a given period time) and delay (the time interval between the arrival of a first part of the data and a related second part). For example, real-time video traffic requires high bandwidth with low variability in delay. Voice traffic requires low variability in delay but does not need high bandwidth. Computer traffic spans a wide range of requirements, from interactive graphics applications which have bandwidth and delay requirements approaching those of real-time video traffic applications, through interactive character-based applications which require low delay but do not need high bandwidth, to applications such as electronic mail which need neither low delay nor high bandwidth.

As explained above, round-robin server 101 can guarantee only minimum access rates and maximum intervals between accesses. Moreover, all entities served by round-robin server 101 have the same minimum access rates and maximum intervals. For these reasons, round-robin server 101 cannot be easily and economically employed in network applications which must deal with traffic moving at different average rates. It is an object of the invention described below to provide apparatus and methods for multiplexing resource 103 among a set of entities at controlled average rates.

SUMMARY OF THE INVENTION

The multiplexing apparatus of the present invention includes a set of servers for providing use of the resource to the entities for intervals of time. Certain servers in the set are capable of activating another server in the set. Each of the certain servers includes means for associating one or more of the entities with the server, means for associating a set of the intervals and a subset of that set with the server, and means operating when the server is active to make the resource available to the one or more entities for, at most, the subset of intervals, and to activate the other server for the remainder of the set of intervals.

It is thus an object of the invention to provide improved apparatus and methods for time multiplexing a resource among entities;

it is another object of the invention to provide an improved data processing system; and it is a further object of the invention to provide improved data transmission apparatus.

Other objects and advantages of the invention will become clear to those of ordinary skill in the art upon consideration of the following Detailed Description and Drawing.

Figure 4:
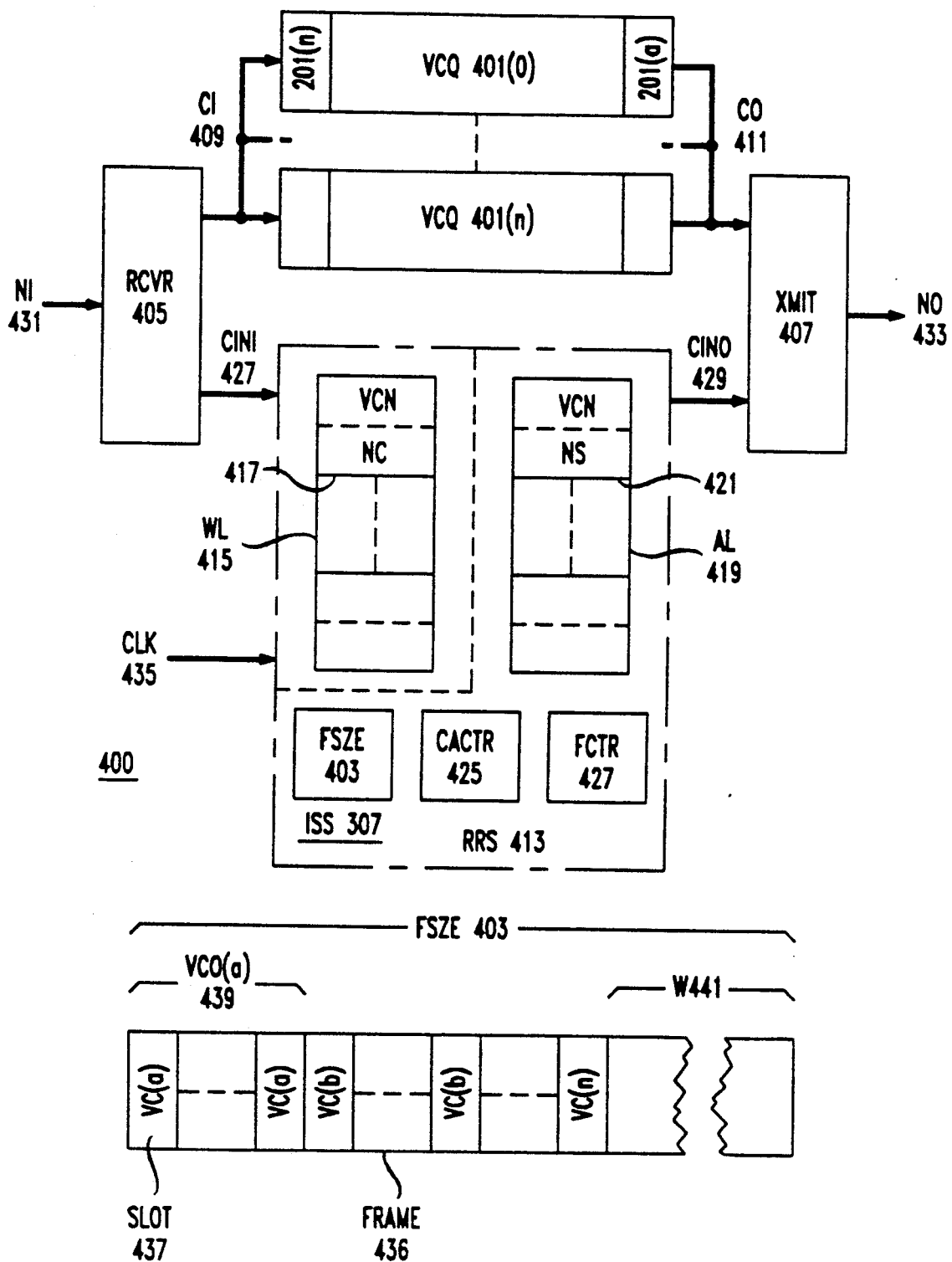
FIG. 4 is a block diagram of a round-robin server of the present invention in a node of a data transmission network.

Reference numbers in the figures have two parts: the right-hand two digits are a reference number within a figure; the remaining digits give the number of the figure in which the item referred to by the reference number first appears; thus, item 401 first appears in FIG. 4.

DETAILED DESCRIPTION

The following Detailed Description will begin with a general overview of the invention. Thereafter will come a description of round-robin servers in ATM networks, a description of the invention as implemented in an ATM network, and finally, examples of how the invention is used in the ATM network.

Figure 3:
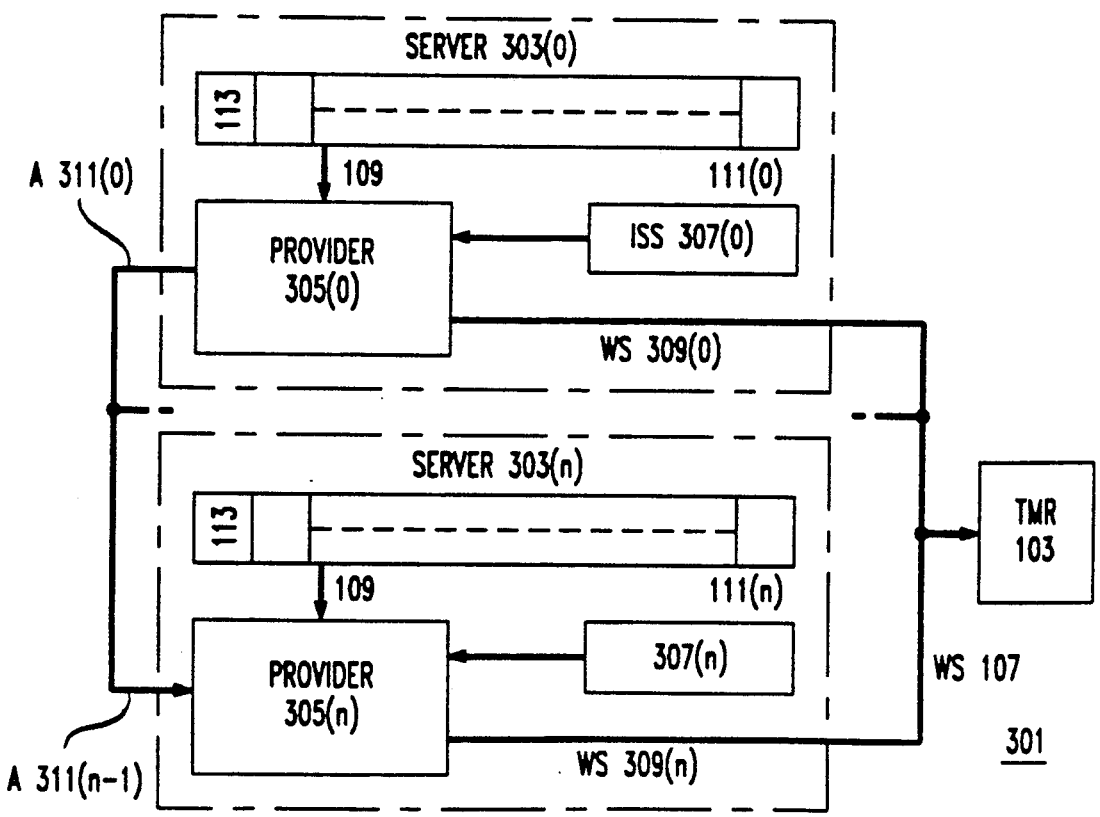
FIG. 3 is a block diagram of a set of round-robin servers of the present invention.

Overview of the Invention: FIG. 3

Figure 1:
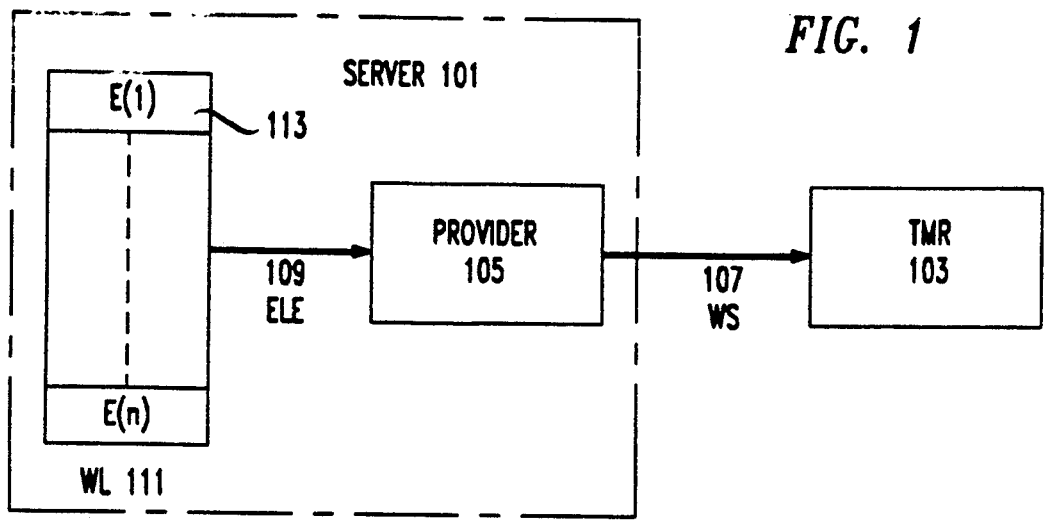
FIG. 1 is a block diagram of a prior-art round-robin server.
Figure 2:
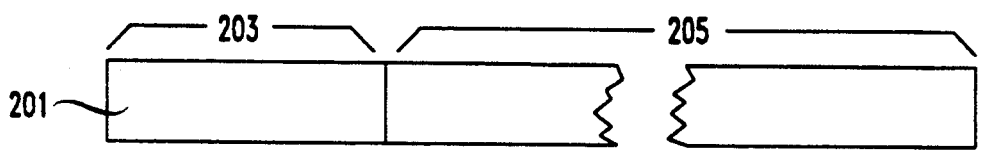
FIG. 2 is a diagram of a cell used in ATM.

FIG. 3 is a block diagram which shows the invention at approximately the same level of abstraction as that of FIG. 1. As in that figure, there is a time-multiplexed resource 103 which is to be multiplexed among a number of entities. The multiplexing is done by a set 301 of servers 303(0) through 303(n). Each server 303(x) has the following components:

work list 111(x) for the entities to which server 303(x) provides access to resource 103;

interval set specifier 307(x), which specifies a set of time intervals on resource 103 to which server 303(x) provides access and a subset of that set;

provider 305(x), which provides access to resource 103 for the entities specified in list 111(x) during the time intervals making up the subset;

work specification line 309(x), which carries a specification of work to be done in a time interval of the subset to resource 103; and activation line (A) 311(x), which carries a signal which activates server 303(x+1).

The first server, here server 303(0), is always active; any other server 303(x) is active only if it is receiving an activation signal on activation line 311(x−1).

Operation is as follows: Server 303(0), being always active, is continually allocating the set of time intervals which are specified for it. During intervals belonging to a subset (which may be the null set or the entire set) of the set of intervals, server 303(0) provides the entities on work list 111(0) with access to resource 103; during intervals which do not belong to the subset, termed in the following the local subset, server 303(0) outputs an activation signal on activation line 311(0).

The signal is received in server 303(1), which then becomes active. When server 303(1) is active, it behaves exactly like server 303(0): it too has a set of time intervals and a local subset thereof, and it too provides the entities on work list 111(1) with access to resource 103 during the intervals of the subset and outputs an activation signal on activation line 311(1) for intervals which are not in the local subset. The remaining servers 303(0 ... (n−1)) behave in the same fashion. Server 303(n), having no next server, simply has a local subset which is the same as its entire set of intervals.

The effect of this arrangement is as follows: if a is the number of intervals in the set belonging to server 303(x−1) and b is the number of intervals in the local subset, b<=a, then server 303(x) has b/a of server 303(x−1)'s access to resource 103; moreover, the proportion of the work done for server 303(x) to the work done for all of the servers 303(0 ... n) is

[b/a for 303(x−1)]*[b/a for 303(x−2)]* ... *[b/a for 303(0)]

For example, if there are three servers in the hierarchy and server 303(0) has 10 intervals, 9 of which belong to the local subset and server 303(1) has 10 intervals, 9 of which belong to the local subset, then server 303(2) will get 1/10*1/10 or 1/100 of the total work done by resource 103.

Further, the rate at which resource 103 does work for a server 303(x) follows the same rule. Thus, if resource 103 works for server 303(x−1) at a rate R, then the rate at which resource 103 works for server 303(x) is b/a * R and the relationship of the rate at which resource 103 works for server 303(0) to the rate at which the resource works for server 303(x) is

[R for 303(0)]*[b/a for 303(1)]* ... *[b/a for 303(x−1)]

Thus, in the above example, server 303(2) provides access to time multiplexed resource 103 at 1/100 of the rate provided by server 303(0). Finally, the rate at which server 303(x) provides access determines the frequency with which the entities in work list 111(x) gain access to resource 103. If an entity on work list 111(0) has access for 1 interval and one on work list 111(2) has access for 1 interval, the entity on work list 111(0) will have access to resource 103 100 times more frequently than the one on entity list 111(2). Further refinements of rate and amount may be made by adjusting the number of intervals in the server 303's set and the number which are provided for a given entity. If we assume that server 303(2)'s set has ten intervals and three of them have been provided for the given entity, then the given entity will receive access to resource 103 three times per thousand of the intervals in which server 303(0) can provide access to resource 103.

As is clear from the foregoing, a hierarchy 301 of servers 303(0 . . . n) can provide access to entities with widely differing requirements for frequency and amount of access to resource 103. The requirements of any entity in this regard may be met by manipulating the sizes of the sets and local subsets in the servers 303 and the number of intervals which a given server 303 provides to a given entity to achieve the proper results.

Round Robin Servers in Nodes of ATM Networks: FIG. 4

As mentioned in the discussion of the prior art, one area in which entities with widely differing requirements must be multiplexed onto a resource is ATM networks. In that situation, the entities are virtual circuits carrying data ranging from digitized television signals being sent in real time to electronic mail, and the resource is a high-speed transmission line. The following discussion of round-robin servers in ATM network nodes is intended to provide a foundation for the discussion of the use of the invention in that context.

FIG. 4 is a schematic drawing of a node 400 of an ATM network. Node 400 receives ATM cells 201 at node inputs (NI) 431 from one or more transmission lines and provides cells 201 at node outputs (NO) 433 to one or more transmission lines. While a cell 201 is in node 400, it is stored in virtual circuit queues (VCQ) 401, one for each virtual circuit which is currently passing through node 400. Cells 201 are output from the virtual circuit queues 401 to node output 433 under control of round-robin server 413.

More specifically, cells 201 are received by receiver (RCVR) 405. Receiver 405 determines from header 203 of each cell 201 which virtual circuit is transmitting cell 201. Receiver 405 then places cell 201 at the tail of virtual circuit queue 401 for the virtual circuit specified in header 203, as shown by the arrow labeled cell input (CI) 409. Receiver 405 also provides the number of the virtual circuit to round-robin server 413, as shown by circuit number in (CINI) arrow 427. When a virtual circuit queue 401 contains cells 201, round-robin server 413 provides the number of virtual circuit queue 401 to transmitter (XMIT) 407, as shown by circuit number out (CINO) arrow 429, and transmitter 407 thereupon outputs the cell 201 at the head of the specified queue 401 to node output 433, as shown by cell output (CO) arrow 411.

In prior-art nodes 400, a simple round-robin server like that shown in FIG. 1 has been employed in place of round-robin server 413 shown in FIG. 4. Such a simple round-robin server has a work list 111 containing only virtual circuit numbers. Each time receiver 405 receives a cell 201 for a virtual circuit, receiver 405 provides the virtual circuit number to the round-robin server. If there is no entry on the work list for the virtual circuit, the round-robin server places an entry with the cell's virtual circuit number at the tail of the work list. The round-robin server reads entries from the head of the work list. For each entry, the round-robin server causes transmitter 407 to output 1 cell from the head of virtual circuit queue 401(x) for the virtual circuit; if there are other cells 201 in queue 401(x), the round robin server returns the work list entry for the virtual circuit to the tail of the work list. As previously explained, if there are n virtual circuits, the round-robin server can guarantee each virtual circuit a minimum of 1/n of transmitter 407's bandwidth and a maximum delay of n*(the time required to transmit one cell 201)

between cells of a vertual circuit, but cannot guarantee an average rate or any delay less than the maximum and cannot provide different average rates to different virtual circuits.

Round-robin server 413 of FIG. 4 is a variation on the simple round robin server described above which can guarantee an average rate to a virtual circuit and which permits different virtual circuits to transmit at differing average rates. The mechanism by which server 413 accomplishes this end is by dividing the output of transmitter 407 into frames. Transmitter 407 can only transmit a single cell 201 at a time. The interval during which transmitter 407 transmits a cell is termed a slot and the length of the interval is termed the slot time. A given round-robin server 413 has a frame consisting of a set number of slots. The frame time is the product of the number of slots in the frame times the slot time. A frame 436 as it would appear at node output 433 is shown at the bottom of FIG. 4. Frame 436 contains FSZE slots 437. Slots containing cells 201 from a given virtual circuit are indicated by means of that virtual circuit's number. The set of cells 201 from a given virtual circuit are indicated by virtual circuit output (VCO) 439. As will be explained in more detail below, some slots of frame 436 may not contain cells 201; these empty slots 437 are indicated by waste (W) 441.

Server 413 includes the following components:
- clock input (CLK) 435 is a signal which controls operation of round robin server 413 so that it can provide a virtual circuit number to transmitter 407 once each slot 437;
- work list (WL) 415, which indicates virtual circuits whose virtual circuits queues 401 contain cells 201;
- allocation list (AL) 419, which indicates what part of server 413's total output is to be devoted to each of the virtual circuits;
- frame zize (FSZE) 403, a value indicating the number of slots 437 in round-robin server 413's frame 436;
- frame counter (FCTR) 427, a counter which is set to the value of frame size 403 when server 413 begins outputting a frame 436; and
- current allocation counter (CACTR) 425, a counter which is set to the number of slots 437 available to a given virtual circuit before round-robin server 413 begins serving the virtual circuit.

Work list 415 is made up of work list entries 417; each work list entry contains two items of information: the number of one of the virtual circuits (VCN) which has a virtual circuit queue 401 in node 400 and the number of cells (NC) currently in virtual circuit queue 401 for that virtual circuit. Allocation list 419 is made up of allocation list entries 421; each allocation list entry contains two items of information: again, a virtual circuit number specifying a virtual circuit having a virtual circuit queue 401 in in node 400, and a number of slots (NS) value, which specifies the maximum number of slots 437 that virtual circuit may have in server 413's frame 436. The total number of slots 437 specified in allocation list 419 may not be greater than the number of slots 437 in frame 436. Taken together, allocation list 419 and frame counter 427 divide the cells output by transmitter 407 under control of server 413 into frames 436 and permit allocation of a maximum number of slots 437 in each frame 436 to a virtual circuit, thereby guaranteeing an average rate of transmission for a given virtual circuit. Further, since the frame time is known, round-robin server 413 can also guarantee a fixed range of delays between consecutive cells 201 transmitted from a virtual circuit queue 401 belonging to a given virtual circuit.

Operation of round-robin server 413 is as follows: when a virtual circuit which passes through node 400 is set up, a virtual circuit queue 401(x) is provided for the virtual circuit; at the same time, a work list entry 417 is made for the virtual circuit; number of cells value NC is set to 0. Further, an allocation list entry 421 is made for the virtual circuit whose number of slots (NS) value indicates the maximum number of slots 437 which the virtual circuit may have in frame 436. Each time receiver 405 receives a cell 201 for a given virtual circuit (x), receiver 405 places cell 201 in queue 401(x) and provides the virtual circuit number to round-robin server 413, which increments the number of cells value in the virtual circuit's work list entry 417.

While receiver 405 is receiving cells 201, server 413 is causing transmitter 407 to output frames 436. The output for each frame 436 represents one pass by server 413 through work list 415 and allocation list 419. The steps of operation for each frame 436 are the following:
  set frame counter 427 to the value of FSZE 403;
  for each entry in allocation list 419, do the following:
    obtain the virtual circuit number and the number of slots from the allocation list entry 421;
    obtain work list entry 417 for the virtual circuit having the virtual circuit number;
    if the number of cells is 0, go on to the next entry in allocation list 419; if it is less than or equal to the number of slots, set CACTR 425 to the number of cells and set NC in work list entry 417 to 0. Otherwise, set CACTR 425 to NS and NC to (NC−NS).
    until CACTR=0,
      output the virtual circuit number to transmitter 407;
      decrement CACTR 425;
      decrement FCTR 427;
    when CACTR=0, start the next entry of allocation list 419;
  if all allocation list entries 419 have been processed, continue decrementing FCTR 427 once every slot time until FCTR 427=0;
  Start the next frame 436.

In another embodiment, work list entries 417 might contain only the virtual circuit number and the allocation list entry 421 might additionally contain a "number already sent" field. There would be no current allocation counter 425. In such an embodiment, server 413 would take work list entries 417 from the head of work list 415. If the "number already sent" field from the corresponding allocation list entry 421 did not yet equal the number of slots field in the allocation list entry, the cell 201 at the head of the virtual circuit's virtual circuit queue 401(x) would be transmitted and the work list entry 417 would go to the tail of work list 415 if there were still cells in queue 401(x). If the "number already sent" field did equal the number of slots field, the work list entry would simply go to the tail of work list 415. In this implementation, the "number already sent" field in each allocation list entry 421 would be reset to 0 each time frame counter 427 was reset to 0.

In round-robin servers 413 employing the above algorithms, a given circuit's average rate is simply the following:

(NS/FSZE)*(frame time)

Since the average rate is a function of the number of slots and the frame size, a virtual circuit's rate may be set by varying those values. Moreover, since a virtual circuit will be served at least once each frame, the delay between two successive cells 201 in the virtual circuit queue 401 for the virtual circuit is always in the range (frame time) < = delay < = [2*(frame time)]

However, as shown by the above, the delay between cells 201 in successive frames increases with the frame size. Further, in both round-robin server 413 and the simple round-robin server, any slots 437 not required for a cell 201 from one of the virtual circuits are simply wasted.

Figure 5:
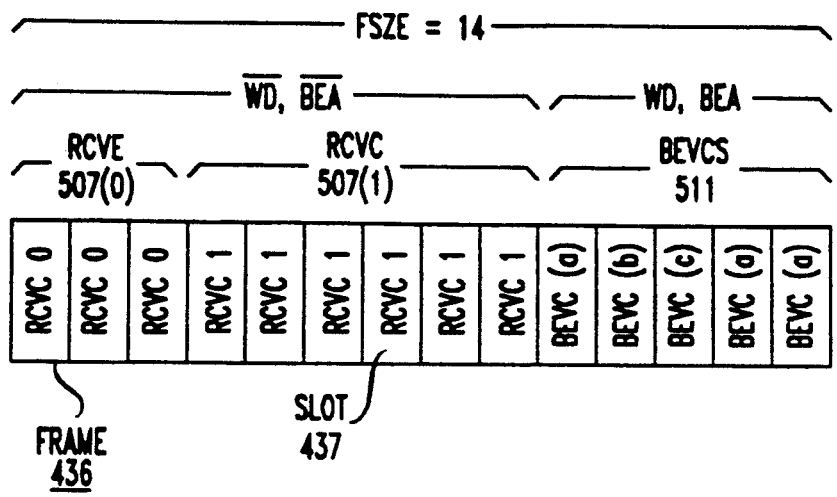
FIG. 5 is a diagram of a frame produced by the round-robin server of FIG. 4.
Figure 11:
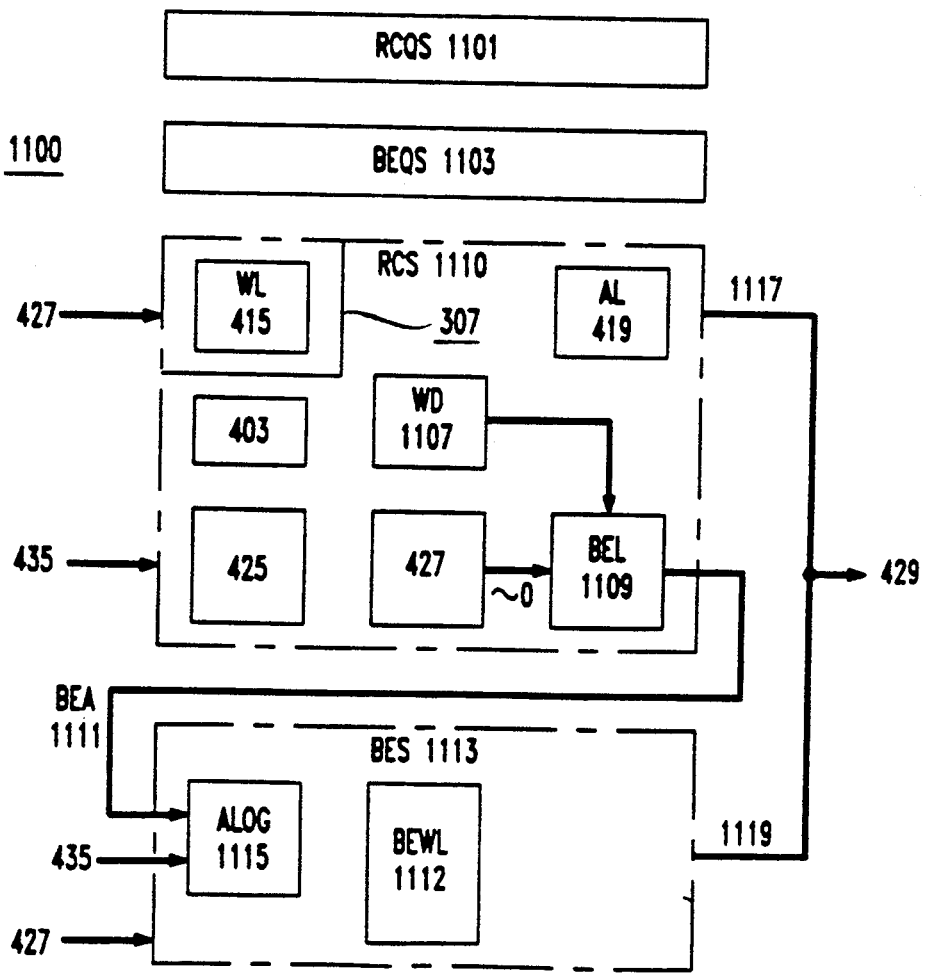
FIG. 11 is a block diagram of a hierarchy of servers consisting of a round-robin server of the present invention and a best-effort server.

Rate-Controlled and Best Effort Round Robin Servers: FIGS. 11 and 5

A difficulty with round-robin server 413 is that each virtual circuit served by server 413 has a reserved portion of frame 436. If virtual circuit queue 401 for the virtual circuit contains fewer cells 201 than there are reserved slots 437 in frame 436 for the circuit, the extra slots are simply wasted. At the same time, much of the traffic which moves over an ISDN network has no rate requirements whatever. Overnight deliver of electronic mail, for example, may be perfectly satisfactory to the users of an electronic mail system. It would clearly be desirable to provide some way of employing the slots 437 which were not used by controlled rate virtual circuits to virtual circuits which had no particular rate requirements.

Apparatus to do the above is shown in FIG. 11. The apparatus shown in the figure works in the same environment as round-robin server 413 of FIG. 4 and combines a modification of controlled rate round-robin server 413 with a simple round-robin server to form a hierarchy 1100 of round-robin servers. Hierarchy 1100 serves two types of virtual circuits: rate-controlled virtual circuits, which require service from transmitter 407 at predictable rates, and best effort virtual circuits, which require only that cells 201 transmitted on the circuits eventually reach their destinations. As before, each virtual circuit has a virtual circuit queue 401; however, in the apparatus of FIG. 11, there are two sets of virtual circuit queues 401: rate-controlled virtual circuit queues 1101 and best effort virtual circuit queues 1103. Rate-controlled queues 1101 are served by rate-controlled server 1110 and best effort queues 1103 are served by best effort server 1113.

Like server 413, rate-controlled server 1110 includes a work list 415, an allocation list 419, a frame size value 403, current allocation counter 425, and frame counter 427. Additional components are work done indicator (WD) 1107 and best effort logic 1109. Work done indicator 1107 indicates that server 1110 has finished outputting cells 201 from rate-controlled queues 1101 as specified in work list 415 and allocation list 419. In one implementation, work done indicator 1107 is a counter which is set to the number of allocation list entries 421 in allocation list 419 at the beginning of a frame 436 and decremented each time processing of an allocation list entry 421 is completed. Best effort logic 1109 provides a best effort activation signal 1111 to best effort server 1113 when server 1110's frame 436 has unused slots.

Best effort server 1113 is a simple round-robin server. Its components include best effort work list (BEWL) 1112, which is a work list of the type described in the discussion of FIG. 1, and activation logic (ALOG) 1115, which activates best effort server 1113 in response to best effort activation signal 1111. In one embodiment, activation logic 1115 also receives clock input 435 and enables receipt of clock input 435 by best effort server 1113. Best effort server 1113 operates only when it receives clock input 435, and consequently operates only when activation logic 1115 is receiving best effort activation signal 1111. Both best effort server 1113 and rate-controlled server 1110 output virtual circuit numbers to transmitter 407, as shown by arrows 1119 and 1117 respectively. However, as will be clear from the following description of the operation of hierarchy 1100, they do not simultaneously output virtual circuit numbers to transmitter 407.

Operation of hierarchy 1100 is as follows: as before, whenever receiver 405 receives a cell 201, receiver 405 places the cell 201 in the virtual circuit queue 401 corresponding to the cell 201's virtual circuit. However, if queue 401 belongs to rate-controlled queues 1101, rate-controlled server 1110 receives the circuit number, while if queue 401 belongs to best effort queues 1103, best effort server 1113 receives the circuit number. Each of the servers updates its work list 415 or 1112 as previously described each time it receives a circuit number.

As described for server 413, server 1110 begins a frame by setting frame counter 427 to the value in frame size 403. Additionally, server 1110 sets work done 1107 to indicate that the rate controlled work is not yet done. Then server 1110 works through allocation list 419, setting current allocation counter 425 for each allocation list entry 419 as previously described. When server 1110 has worked through all of the allocation list entries 419, it sets work done 1107 to indicate that the rate controlled work is done. Best effort logic 1109 receives an output of work done 1107 and the current value of frame counter 427 and produces best effort activation signal 1111 when frame counter 427 has not yet reached 0 and work done 1107 indicates that the rate controlled work is done. In other words, best effort activation signal 1111 is active for that portion of frame 436 which server 1110 does not require for rate-controlled virtual circuits.

While best effort activation signal 1111 is active, best effort server 1113 works through best effort work list 1112. For each slot which could not be used by rate-controlled server 1110, best effort server 1113 outputs the circuit number specified by the best effort work list entry at the head of best effort work list 1112 to transmitter 407 and transmitter 407 outputs the cell 201 at the head of the virtual circuit queue 401 in best effort queues 1103 corresponding to the virtual circuit number; if virtual circuit queue 401 is not empty after cell 201 has been output, the best effort work list entry is placed at the tail of the best effort work list.

FIG. 5 shows a frame 436 output by hierarchy 1100 under the following circumstances:

RCQS 1101 contains three rate-controlled queues for three rate-controlled virtual circuits RCVC(0 . . . 2)

BEQS 1103 contains three best effort queues for three best effort virtual circuits BEVC(a . . . c);

Frame 436 has 14 slots 437, so FSZE=14;

Allocation list 419 in server 1110 has allocated 5 slots for RCVC(0), 6 for RCVC(1), and 3 for RCVC(2).

Work list 415 indicates that RCQS 1101 have 3 cells 201 for RCVC(0), 8 cells 201 for RCVC(1), and none for RCVC(2);

BEQS 1103 has 5 cells 201 for BEVC(a) and 1 each for BEVC(b) and (c);

BEWL 1112 has 1 entry each for BEVC(a . . . c).

At the beginning of the frame, FCTR 427 is set to 14 and WD 1107 indicates that the rate-controlled work is not done; consequently, best effort activation signal 1111 is inactive. As previously described, rate-controlled server 1110 works through allocation list 419; allocation list entry 421 for RCVC(0) has NS=5, but work list entry 417 for RCVC(0) has NC=3, indicating only 3 cells 201, so CACTR 425 is set to 3 and rate-controlled server 1110 outputs virtual circuit number 0 to transmitter 407 for three slots 437, as indicated by RCVC 507(0) in FIG. 5. When this is finished, FCTR has the value 11. Allocation list entry 421 for RCVC(1) has NS=6 and work list entry 417 has NC=8, so CACTR is set to 6 and rate-controlled server 1110 outputs virtual circuit number 1 to transmitter 407 for six slots, as indicated by RCVC 507(1). FCTR 427 now has the value 5. Allocation list entry 421 for RCVC(2) has NS=3, but work list entry 417 for RCVC(2) has NC=0, so rate controlled server does not output virtual circuit number 2 to transmitter 407. At this point, all entries in allocation list 419 have been processed, so WD 1107 indicates that the rate-controlled work is done. FCTR 427 still has the value 5, so best effort logic 1109 activates best effort activation signal 1111. Rate-controlled server 1110 continues to decrement FCTR 427 each time transmitter 407 receives a virtual circuit number from hierarchy 1100.

In response to signal 1111, best effort server 1113 begins working through best effort work list 1112. There are entries for BEVC(a . . . c), but only BEVC(a) has more than one cell 201 in its virtual circuit queue 401. Consequently, best effort server 1113 provides the virtual circuit number for BEVC(a) to transmitter 407, places the entry for BEVC(a) at the tail of best effort work list 1112, provides the virtual circuit number for BEVC(b) to transmitter 407, provides the virtual circuit number for BEVC(c) to transmitter 407, and then provides the virtual circuit number for BEVC(a) twice again, each time placing the entry for BEVC(a) at the tail of best effort work list 1112. Thus, as shown by BEVCS 511 of FIG. 5, five slots 437 are provided for the best effort virtual circuits and no slots 437 of frame 436 are wasted. At this point, FCTR 427 of rate-controlled server 1110 has reached 0. This in turn inactivates BEA signal 1111 and turns off best effort server 1113. Apparatus 1100 then causes transmitter 407 to output the next frame in the manner just described.

In the example of FIG. 5, the best effort virtual circuits only receive those slots which are not used by rate-controlled virtual circuits; consequently, if there is enough rate-controlled traffic to fill all of the slots 437 allocated to each rate-controlled virtual circuit, no best effort traffic will be transmitted. However, hierarchy 1100 also permits reservation of a certain number of slots 437 for best effort virtual circuits. This is done simply by allocating less than all of the slots in frame 436 in allocation list 419. Since best effort server 1113 runs whenever allocation list 419 has been finished but FCTR 427 does not yet equal 0, the best effort virtual circuits will always receive slots 437 as follows:

(BE slots) > = [FSZE − (no. of slots allocated in allocation list)]

The proportion of transmitter 407 allocated to the best effort virtual circuits is of course (BE slots)/FSZE

Hierarchies of Rate Controlled Servers: FIGS.6-9

While rate-controlled round-robin server 413 guarantees average rates and ranges of delays between two cells 201, the rate-controlled virtual circuits served by round-robin server 413 or hierarchy of servers 1100 cannot have greatly differing average rates.

There are two reasons for this. The first is that a rate controlled virtual circuit's rate is (NS for the virtual circuit)/(FSZE*slot time)

Since NS can never be smaller than 1 or greater than FSZE, the average rates available can range only from 1/(FSZE*slot time)

to

FSZE/(FSZE*slot time).

The second is that, as previously pointed out, delay is a function of frame size. When a virtual circuit is carrying cells 201 for real-time transmissions such as digitized television or voice transmissions, too great a delay between groups of cells on the circuit can produce the phenomenon called jitter.

Figure 6:
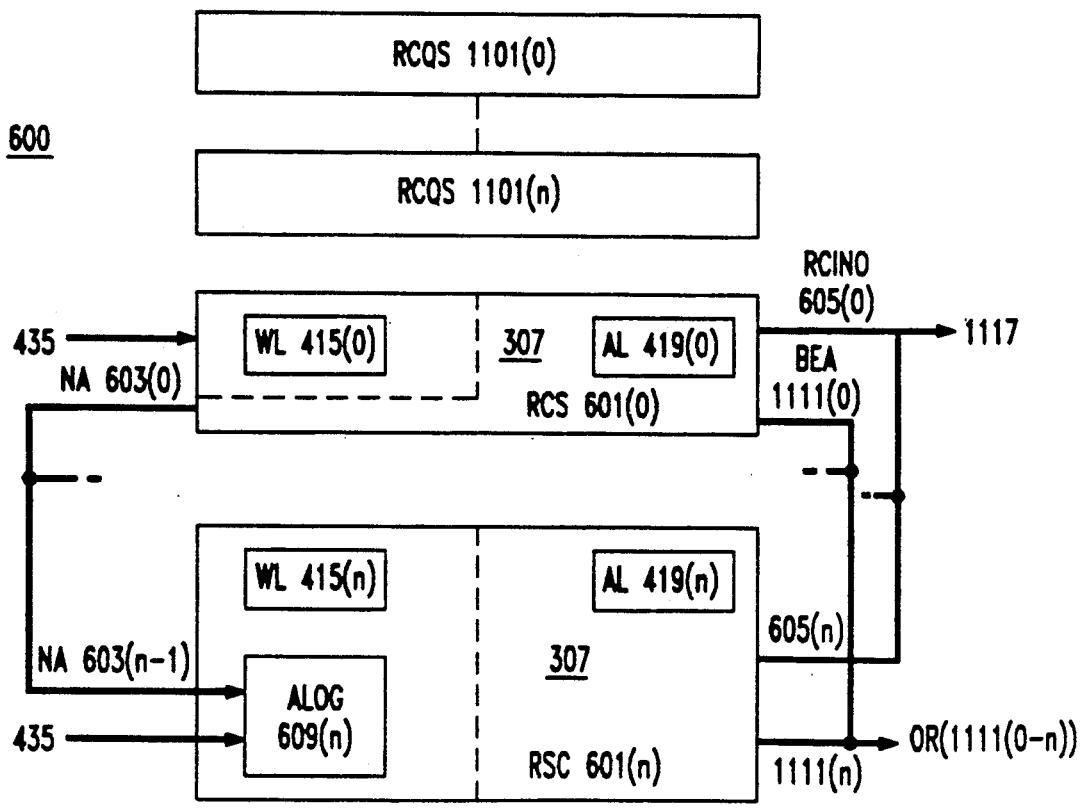
FIG. 6 is a block diagram of a set of round-robin servers of the present invention in a node of a data transmission network.

One solution to the problem of providing a great range of controlled rates is the hierarchy of rate-controlled servers shown in FIG. 6. Hierarchy 600 includes rate-controlled servers 601(0) through 601(n). Associated with each of the servers (RCS) 601(0 ... n) is a set rate-controlled queues (RCQS) 1101(0 ... n) for rate-controlled virtual circuits served by the servers 601 (0..n). Each of the rate-controlled servers 601 has its own work list 415 and its own allocation list 419 with entries like those described in the discussion of round-robin server 413. Frame size is further specified by FSZE. In each server 601(x) other than server 601(n), frame 436 is subdivided into two parts: that reserved for server 601(x) and that reserved for server 601(x+1). Allocation list 419 allocates only slots in the part of server 601(x)'s frame reserved for server 601(x). As with rate-controlled server 1110, not all slots in that part of the frame 436 need be allocated by allocation list 419.

Each rate-controlled server 601 further has a line outputting a next activation signal (NA) 603 to the next rate controlled server 601 in the hierarchy. The line carrying NA signal 603(x−1) is input to activation logic 609(x), which responds to an active NA signal 603(x−1) by enabling clock input 435. When clock input 435 is enabled, rate-controlled server 601(x) operates and outputs rate-controlled circuit numbers 605(x), which are provided as shown by arrow 1117 to transmitter 407 along with best effort circuit numbers from best effort server 1113. As will again become clear from the following description of the operation of hierarchy 600, transmitter 407 receives a virtual circuit number from only a single member of hierarchy 600 or from best effort server 1113 at a time. Another line outputs BEA signal 1111(x), which as previously indicated, activates best effort server 1113. All BEA signals 1111(0 ... n) are ORed together (for example, by means of a wire OR) and provided as BEA signal 1111 to a single best effort server 1113 (not shown in FIG. 6). Other details of interval set specifier 307, including counters, will be discussed later.

Operation of the hierarchy is as follows: RCS 601(0) is always active. It works through allocation list 419(0) and work list 415(0) as previously described for server 413. As indicated above, allocation list 419(0) cannot allocate a number of slots 437 in frame 436(0) greater than the number of slots 437 reserved in frame 436(0) for server 601(0). If there are slots 437 remaining in the reserved portion after server 601(0) has worked through allocation list 419(0), server 601(0) activates BEA signal 1111(0) and best effort server 1113 outputs best effort circuit numbers to transmitter 407 until there are no slots 437 remaining in the reserved portion.

For slots 437 in rate-controlled server 601(0)'s frame 436(0) which do not belong to the reserved portion, rate-controlled server 601(0) activates next activation signal 603(0). As long as next activation signal 603(0) is active, rate controlled server 601(1) works in the same fashion as rate controlled server 601(0). Until rate-controlled server 601(1) has finished working through allocation list 419(1) and work list 415(1), rate-controlled server 601(1) outputs a circuit number for one of the rate-controlled circuits in RCQS 1101(1) to transmitter 407 instead of rate-controlled server 601(0) doing so. If there are slots reserved for server 601(1) in frame 436(1) after server 601(1) has worked through allocation list 419(1), server 601(1) activates BEA signal 1111(1) and best effort server 1113 provides a circuit number for a best effort circuit in the slot. For the unreserved slots in frame 436(1), server 601(1) activates NA signal 603(1), which in turn activates rate-controlled server 601(2). Rate-controlled server 601(2) in its turn operates in exactly the same fashion as rate-controlled server 601(1). Rate controlled server 601(n) differs from rate-controlled servers 601 (1 ... (n−1)) only in that it has no next rate-controlled server 601(n+1), and consequently, all slots of frame 436(n) are reserved for server 601(n).

Figure 7:
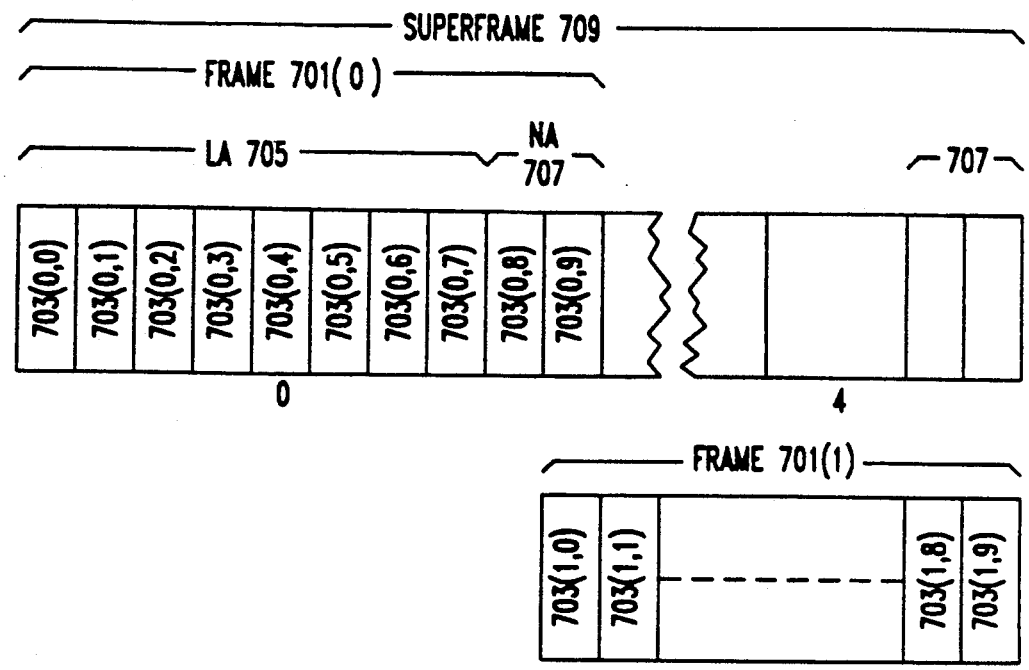
FIG. 7 is a diagram of frames produced by the round-robin servers of FIG. 6.

FIG. 7 shows the output of a two-server hierarchy 600 to transmitter 407. FIG. 7 presumes that server 601(0) in the hierarchy has a frame 701(0) with 10 slots, 8 of which are reserved for server 601(0) as local allocation (LA) 705; the remaining two frames are reserved for server 601(1) as next allocation (NA) 707. Server 601(1) also has a frame 701(1) with 10 slots, all of which are reserved for server 601(1). Transmitter 407 first receives eight virtual circuit numbers from either server 601(0) or best effort server 1113; then it receives two virtual circuit numbers from either server 601(1) or best effort server 1113. At this point, server 601(0) has gone through one frame 701(0), while server 601(1) has gone through 2 slots of frame 701(1). When server 601(0) has gone through five frames 701(0), server 601(1) will have gone through one frame 701(1). The number of frames 436(0) which server 601(0) goes through before server 601(n) completes a single frame 436(n) makes up a single superframe. In FIG. 7, superframe 709 contains five frames 701(0). As may be seen from FIG. 7, next allocation 707 is 1/5 of frame 701(0), and consequently, rate-controlled server 601(1) runs 1/5 as fast as rate-controlled server 601(0).

Figure 8:
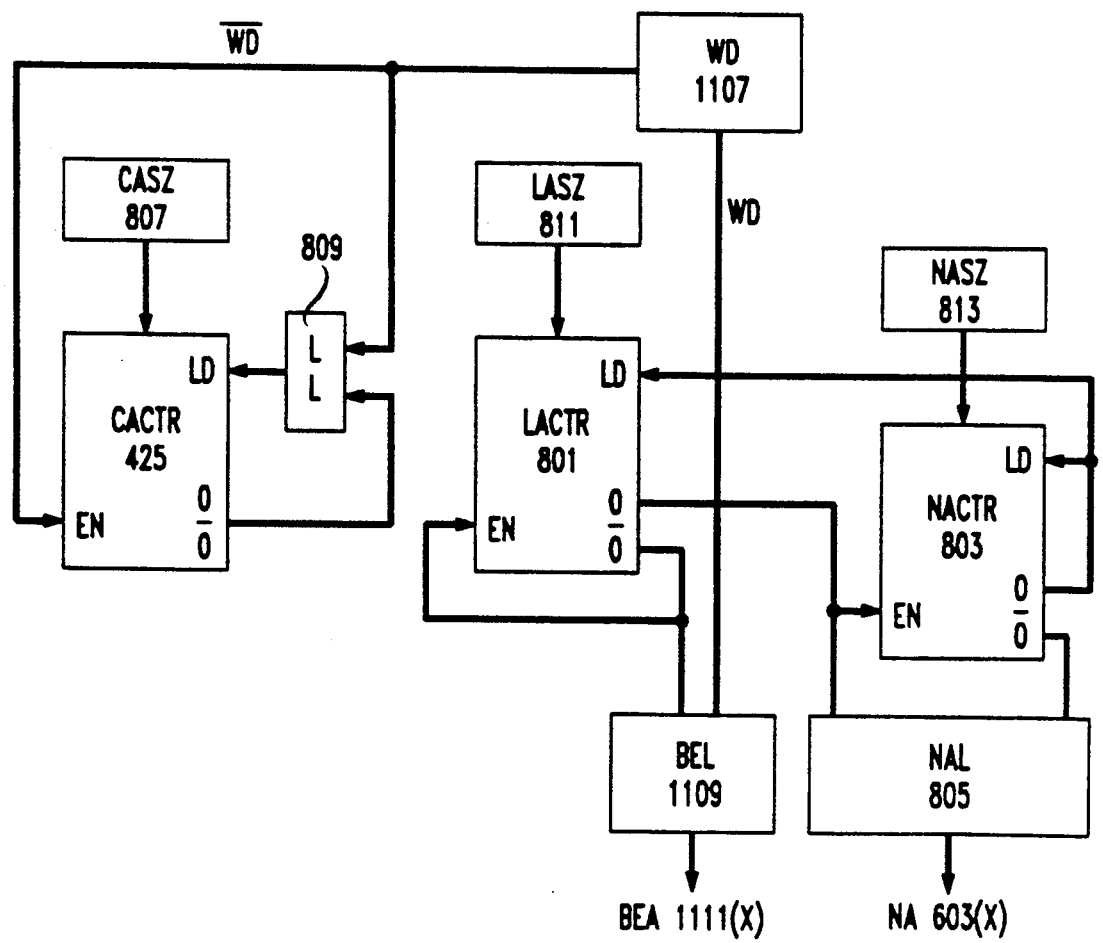
FIG. 8 is a detailed block diagram of interval set specifier 603 in a preferred embodiment.

FIG. 8 shows counters and control logic in interval set specifier 307 for a rate-controlled servers 601(x). It is presumed that the counters operate only when rate-controlled server 601(x) is active. There are three counters:

current allocation counter (CACTR) 425 keeps track of how much work for the current rate-controlled circuit remains to be done;

local allocation counter (LACTR) 801 keeps track of how much of local allocation 705 is left in frame 701(x);

next allocation counter (NACTR) 803 keeps track of how much of next allocation 707 is left in frame 701(x).

Each counter counts when it receives an active signal at the EN input and loads a starting value when it receives an active signal at the LD input. Each counter further has two outputs: a 0 output which is active when the value in the counter is 0 and a $\overline{0}$ output which is active when the value in the counter is not 0.

The counters are loaded from three registers: Current allocation size (CASZ) 807 is set each time an allocation list entry 421 is processed. The value it contains specifies the number of slots 437 the virtual circuit represented by allocation list entry 421 is to receive in the current frame frame 701(x); next allocation size 813 (NASZ) contains a value specifying the number of slots 437 in frame 701(x) which are reserved for server 601(x+1); These values remain constant until frame 436 is redefined. The sum of the values in LASZ 811 and NASZ 813 is equal to FSZE. The remaining logic in FIG. 8 includes work done (WD) 1107, best effort logic (BEL) 1109, load logic (LL) 809, and next activation logic (NAL) 805. Work done logic 1107 generates $\overline{WD}$ as long as server 601(x) has not yet worked through allocation list 419(x) and otherwise generates WD. Best effort logic 1109 generates best effort activation signal 1111(x). Load logic 809 loads CACTR 425 from CASZ 807 when CACTR 425 reaches 0 and $\overline{WD}$ indicates that allocation list 419 is still being processed. Next activation logic 805 generates next activation signal 603(x) from the time that LACTR 801 reaches 0 until the time that NACTR 803 reaches 0.

As may be seen from FIG. 8, LACTR 801 and NACTR 803 are loaded when NACTR 803 reaches 0, i.e., at the beginning of a new frame 701(x). LACTR 801 begins counting when it is loaded and continues to count until it reaches 0. When LACTR 801 reaches 0, it enables NACTR, which continues to count until it reaches 0. CACTR 425 is loaded from CASZ 807 whenever $\overline{WD}$ is active and CACTR 425 reaches 0, i.e., at the beginning of a set of slots for a new channel. Best effort logic 1109 generates signal 1111(x) when WD is active and LACTR 801 has not yet reached 0, i.e., after server 601(x) has worked through allocation list 419(x) but while there are slots remaining in local allocation 705. Next activation logic 805 generates next activation signal 603(x) as long as LACTR 801 has reached 0 but NACTR 803 has not yet reaced 0.

Figure 9:
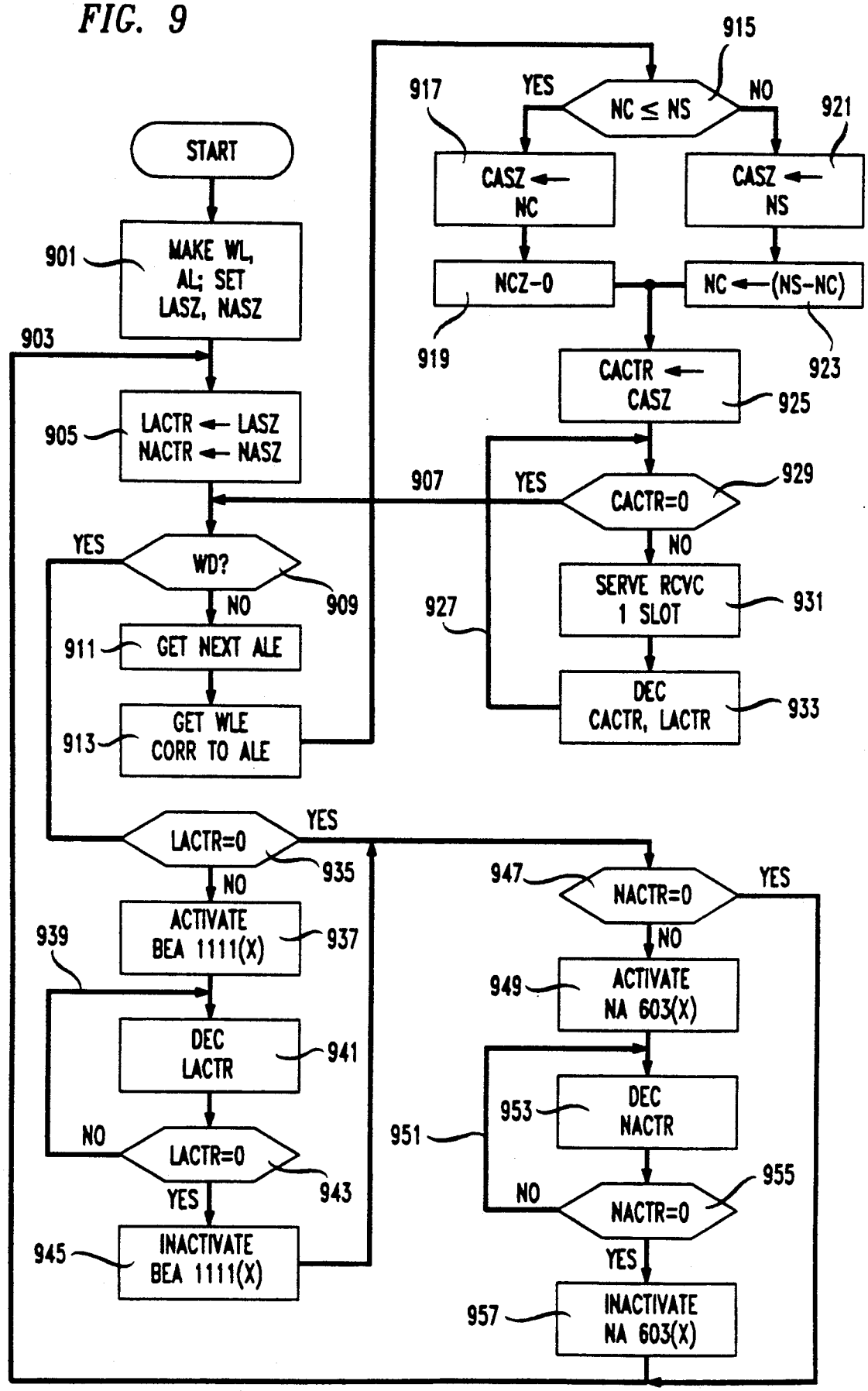
FIG. 9 is a flow chart of operation of a round-robin server of FIG. 6.

FIG. 9 is a flow chart showing the operation of the hierarchy of servers 600 together with a single best effort server 1113. A given server 601(x) executes steps of the flow chart only while server 601(x) is active. When server 601(x) becomes inactive, execution of the flow chart simply halts and is resumed at the point at which it halted when server 601(x) again becomes active.

Before server 601(x) can operate, it must be initialized, as shown in step 901. In that step, work list 415(x) and allocation list 419(x) for the server are set up and LASZ 811 and NASZ 813 are set to the proper values for frame 701(x) to be output by server 601(x). Initialization may be done by a control processor (not shown) which has access to all of the servers in hierarchy 600.

Once server 601(x) is initialized, it executes the loop indicated by 903 for each frame which server 601(x) outputs. Within that loop, there are four other loops. Loop 907 works through work list 415(x) and allocation list 419(x) until allocation list 419(x) is finished; loop 927 serves a rate-controlled virtual circuit for all of the slots permitted for that circuit in the current frame; loop 939 generates BEA signal 1111(x) from the time allocation list 419(x) is finished to the time that LACTR 801=0; loop 951, finally, generates NA signal 603(x) from the time LACTR 801=0 until the time that NACTR 803=0.

Continuing in more detail, the first step in loop 903, as shown in box 905, is setting LACTR 801 to the value in LASZ which indicates how many slots 437 are reserved for server 601(x) in frame 701(x) and NACTR 803 to the value in NASZ 813 which indicates how many slots 437 are to be provided for server 601(x+1). Next comes decision box 909. If WD 1107 is not producing the WD signal, indicating that all entries in allocation list 419(x) have been processed, the next step is 911; otherwise, it is 935 in FIG. 9.

Continuing with steps 911 and 913, those steps get the next allocation list entry 421 to be processed and work list entry 417 which has the same virtual circuit number as the virtual circuit number in allocation list entry 421. The next step is decision box 915. There, the value of NC from work list entry 417 is compared with the value of NS from allocation list entry 421. If NC<NS, indicating that the number of cells 201 in the queue 401 for work list entry 421's virtual circuit is less than the number of slots which have been allocated to the virtual circuit in frame 701(x), then CASZ 807 is set to NC and NC in work list entry 417 is set to 0, as shown in steps 917 and 919. Otherwise, CASZ 807 is set to NS and NC in work list entry 417 is set to (NS−NC). CACTR 425 is then set to the value of CASZ in step 925. Steps 929-933 make up loop 927. In step 929, CACTR 425 is tested to see whether the rate-controlled virtual circuit has been served for all of the slots specified in CASZ 807. If that is not the case, the virtual circuit is served for one slot in step 931 and counters CACTR 425 and LACTR 801 are decremented in step 933. If CACTR is equal to 0, indicating that the virtual circuit has been served for all of the slots, the next step is again 909.

Once the end of allocation list 419(x) has been reached, the next step is 935 in FIG. 9. There, LACTR 801 is tested. If it does not yet equal 0, i.e., if there are still slots available in local allocation portion 705 of frame 701(x), the next step is to activate BEA signal 1111(x), which activates best effort server 1113. Loop 939, consisting of steps 941 and 943, keeps BEA signal 1111(x) active until LACTR 801 has been decremented to 0. Each time LACTR 801 is decremented, best effort server 1113 provides a best effort virtual circuit number to transmitter 407. When LACTR 801 reaches 0, step 945 inactivates BEA signal 1111(x).

Once LACTR 801 has reached 0, the next step is 947. If NACTR 803 equals 0, there is no next allocation portion 707 of frame 701(x), i.e., server 601(x) is the lowest server 601 in hierarchy 600. If NACTR 803 does not equal 0, NA signal 603(x) is activated, which in turn activates server 601(x+1). Loop 951 continues activation of server 601(x+1) until NACTR 803 has been decremented to 0. Each time NACTR 803 is decremented in block 953, server 601(x+1) executes the action specified for one of the slots in frame 701(x+1). When the test in block 955 shows that NACTR 803=0, step 957, which inactivates NA signal 603(x), is executed. At this point, frame 701(x) is finished and the next step is 905 in FIG. 9, which begins the next frame 701(x).

Sizing Virtual Circuit Queues for Rate Controlled Virtual Circuits

An important advantage of rate-controlled virtual circuits is that the user of the virtual circuit agrees in advance to the average rate at which he will transmit cells to the virtual circuit. The average rate is expressed as $$\text{LIMIT cells over averaging time interval AI}$$

If the user transmits more than LIMIT cells over time interval AI, the virtual circuit may simply discard the surplus cells. Because this is the case, the size of virtual circuit queues 401 used for rate-controlled virtual circuits is simply a function of the rate requested by the user and the frame time of server 601 to which the virtual circuit is assigned.

Specifically, the rate at which a server 601(x) having a frame time FT(x) causes transmitter 407 to transmit cells of a virtual circuit i is $$NS(i)/FT(x).$$

Consequently, server 601(x) will transmit cells for circuit i at the proper rate if $$\text{LIMIT}(i)/AI(i) < = NS(i)/FT(x)$$

Sizes of queues 401 to ensure such a rate depend on where in the virtual circuit path server 601(x) is located. If server 601 is in an edge node of a network, i.e., the node to which the user of the virtual circuit directly provides his data, provision must be made for burstiness, i.e., the user may provide all of his cells 201 within a very small portion of averaging interval AI(i). To deal with this, queue 401(i) in the edge node should have a capacity sufficient to accommodate 2*LIMIT(i) cells 201. Since bursts are smoothed out by server 601 in the edge node, queues 401(i) in internal nodes need only have a capacity sufficient to avoid jitter. Such a capacity is provided by queues 401(i) having a capacity of 2*NS cells 201.

Adjusting Rates in Hierarchy 600: FIG. 7

In the example of FIG. 7, frame 701(1) had 10 slots. Some portion of those slots, say 8, belongs to local allocation 705(1) for the frame. If server 601(1) to which frame 701(1) belongs is serving four virtual circuits, each one of which has two slots in local allocation 705(1), then each of the virtual circuits will have 1/25 of the total bandwidth of transmitter 407. If a fifth virtual circuit requests a rate corresponding to 1/25 of the bandwidth, it is not enough to simply add two slots to local allocation 705(i), since in that case frame 701(1) will have 12 slots and each of the virtual circuits will have not 1/25 of the total bandwidth, but instead 1/30.

Instead, both frame 7001(0) and frame 701(1) must be adjusted. If NA 707(0) receives a third slot 437 and frame 701(1) is increased from 10 slots 437 to 14 slots 437, then the new virtual circuit and each of the older virtual circuits will have $$(3/10)*(2/14)=3/70$$

of the total bandwidth, or a little more than the 1/25 they formerly had. As may be seen from the above, an addition of slots for a virtual circuit at a given level of hierarchy 600 may require adjustments of slots at all other levels. Such adjustments must be made at the end of a superframe.

Implementation Variations

Other implementations of individual servers 413 and 601 and of hierarchies 1100 and 600 are of course possible. As already indicated with regard to server 413, different implementations of work list 415 and allocation list 419 are possible. For example, the two lists might be combined into a single allocation list 419 in which each entry 421 had an NC field as well as an NS field. The foregoing discussion has further presumed that each server in a hierarchy is implemented using separate hardware. In some implementations, however, there may be only a single set of counters which would be loaded with the counter values of the server which was currently actually providing virtual circuit numbers to transmitter 407. In such an implementation, memory associated with the server would contain a work list 415 and an allocation list 419 and counter state for each of the hierarchy of counters implemented using the single set of counters. Further, the hierarchy might be implemented by means of a program running on a single processor. For example, the hierarchy could be implemented by means of a recursive server procedure. In such an implementation, activation of a server would take place when the procedure recursively invoked itself. Again, counter state and lists 415 and 421 would be stored in persistent memory and associated with each level of the recursive invocation.

Figure 10:
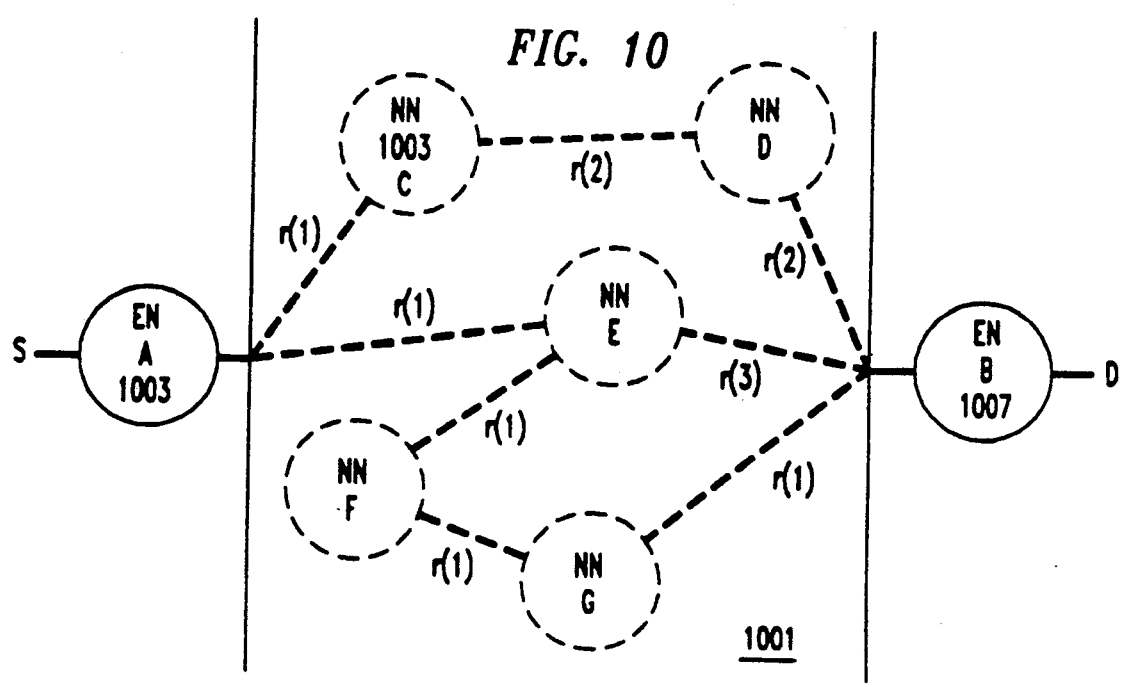
FIG. 10 is a diagram of a network with nodes in which the round robin servers of the present invention are employed.

Hierarchical Servers in Networks: FIG. 10

FIG. 10 shows a network 1001. From the point of view of a user of network 1001, two nodes of the network are visible: edge node A 1003, to which he has direct access when making a transfer of data, and edge node B 1003, to which the destination D of the transfer has direct access. The other non-edge nodes 1003 are invisible to the user. When the user calls destination D, network 1001 sets up a virtual circuit across network 1001. The route chosen depends on the condition of network 1001. For example, in FIG. 10, a call from S to D may go by a virtual circuit which takes one of the following paths:

Nodes A,C,D,B

Nodes A,E,B
Nodes A,E,F,G,B

The maximum rate possible on a given path is the lowest rate on any of its links. In FIG. 10, it is presumed that links in network 1001 have one of three rates, r(1), r(2), and r(3), where $$r(1) > r(2) > r(3)$$

Thus, the path A,C,D,B has a maximum rate of r(2), the path A,E,B has a maximum rate of r(3), and the path A,E,F,G,B has a maximum rate of r(1).

In a network 1001 in which the nodes contain hierarchies of servers 600, a user at source S would specify not only the destination D for his call but also the transmission rate he requires for the call. Edge node A would then find a path through network 1001 which had at least the transmission rate required by the user and the hierarchy of servers 600 at each node on the path would set up its rate-controlled queues 401 and servers 601 to provide transmission at the proper rate. if no such path existed, edge node A would refuse the call and indicate what the maximum possible rate was. If the rate proposed by the user at S is acceptable, edge node A sets up a virtual circuit for the rate as just described. Since server 601(x) is serving at the proper rate and all of the servers 601(x) on the selected path are transmitting at that rate, network 1001 can guarantee to the user that his transmission will take place at the promised average rate and delay.

A further aspect of the use of hierarchies of servers 600 in network 1001 is the possibility of reclaiming bandwidth which is unused by a given rate-controlled virtual circuit i for use by other rate-controlled virtual circuits. This would be done by keeping track of how many slots 437 of its allocation virtual circuit i actually uses to send cells 201 during each superframe. If it is not generally using its allocation, edge node 1003 can inform the user of the virtual circuit of that fact and suggest a lower (and cheaper) rate. If the user agrees, the circuit can be set up to run at the lower rate as described above. In other embodiments, edge node 1003 might simply lower virtual circuit i's rate to one which it really requires without obtaining agreement from the user.

CONCLUSION

The foregoing Detailed Description has disclosed how rate-controlled round-robin servers may be used generally to time-multiplex a resource among a plurality of entities, has shown specifically how rate-controlled round-robin servers, rate controlled round-robin servers combined with best effort servers, and hierarchies of rate-controlled round-robin servers may be employed in ISDN networks to offer a wide range of guaranteed rates of service, and has further disclosed implementations of rate controlled round-robin servers and hierarchies thereof. As has already been pointed out, such rate-controlled servers and hierarchies may be employed not only in ISDN networks, but in any situation in which a resource is time-multiplexed among a plurality of entities; further, as already pointed out, rate-controlled servers and hierarchies thereof which have the properties of the servers and hierarchies disclosed herein may be implemented in many ways, including ones not shown or described herein. For these reasons, the Detailed Description is to be regarded in all respects as merely illustrative and exemplary, and the invention disclosed herein is to be defined soley by the claims as interpreted in light of the doctrine of equivalents.

We claim:

1. Apparatus for time multiplexing a resource among one or more entities, the apparatus comprising:
   a set of at least two servers for providing use of the resource to the entities for intervals of time, at least one of the servers being capable of activating another server in the set and the at least one server comprising:
   means for associating at least one of the entities with the server;
   means for associating a set of the intervals of time with the server; and
   means operating when the server is active to make the resource available to the at least one associated entity for a subset of the set of intervals of time and to activate the other server for intervals of time remaining in the set of intervals of time.

2. The apparatus set forth in claim 1 wherein:
   the maximum number of intervals of time in the subset is fixed at a number which is less than the number of intervals of time in the set of intervals of time.

3. The apparatus set forth in claim 2 wherein:
   the other server is also one of the at least one servers.

4. The apparatus set forth in claim 1 wherein:
   the number of intervals of time in the subset is the maximum number currently available to the at least one associated entity.

5. The apparatus set forth in claim 1 wherein:
   the subset is further subdivided into entity subsets of the intervals of time corresponding to the associated entities; and
   the means operating when the server is active makes the resource available to each associated entity for a number of intervals of time no greater than the number of intervals of time in the entity subset corresponding to the associated entity.

6. The apparatus set forth in claim 5 wherein:
   the at least one server is capable of activating an additional other server;
   the size of the subset is fixed at a number of intervals of time less than the number of intervals of time in the set of intervals; and
   the means operating when the at least one server is active operates to make the resource available to each of the at least one associated entities for a number of intervals of time no greater than the number of intervals in the entity subset corresponding to the associated entity, operates to activate the additional other server for any intervals of time remaining in the subset, and operates to activate the other server for the intervals remaining in the set of intervals of time.

7. The apparatus set forth in claim 6 wherein:
   the additional other server is also one of the at least one servers.

8. The apparatus set forth in claim 7 wherein:
   the sum of the maximum number of intervals of time in each of the entity subsets is less than the number of intervals of time in the subset.

9. The apparatus set forth in claim 1, claim 2, claim 4, claim 5, claim 6, claim 7, or claim 8 wherein:
   the other server is a simple round-robin server.

10. The apparatus set forth in claim 9 wherein:
    there is a single simple round robin server.

11. The apparatus set forth in claim 1, claim 2, claim 3, claim 4, claim 5, claim 6, claim 7, or claim 8 wherein:

the set of the intervals of time is periodically repeating.

12. A method of time multiplexing a resource among one or more entities by providing the resource to the entities for fixed intervals of time, the method comprising the steps of:

establishing a first set of the intervals of time;

associating subsets of the first set with first certain of the entities; and repeatedly providing the resource to the first certain entities for the set of intervals of time; and during each repetition of the set of intervals of time, providing the resource to a given one of the first certain entities for a number of intervals of time no greater than the number of intervals in the subset associated with the given entity and providing the resource to at least one of the entities which is not one of the first certain entities for intervals of time remaining in the set of intervals of time.

13. Apparatus for controlling the flow of cells of digitized data in a plurality of virtual circuits, the apparatus comprising:

at least two sets of storage means for storing the cells, each storage means being associated with a virtual circuit of the plurality of virtual circuits;

receiving means for receiving the cells and placing each cell in the storage means associated with the virtual circuit which is carrying the cell;

transmitting means for transmitting the cells, each cell being transmitted in an interval of time; and a set of at least two servers for causing the transmitting means to transmit cells from the storage means when active, at least one of the servers being capable of activating another server in the set and the at least one server comprising means for associating one of the sets of storage means with the server;

means for associating a set of the intervals of time with the server; and means operating when the server is active to cause the transmitting means to transmit cells from storage means in the associated set of storage means for a subset of the intervals of time and to activate the other server for intervals of time remaining in the set of intervals of time.

14. The apparatus set forth in claim 13 wherein:

the maximum size of the subset is fixed at a number of intervals less than the number of intervals of time in the set of intervals of time.

15. The apparatus set forth in claim 14 wherein:

the other server is also one of the at least one servers.

16. The apparatus set forth in claim 13 wherein:

the subset is further subdivided into virtual circuit subsets of the intervals, each virtual circuit subset corresponding to a virtual circuit associated with a storage means in the set of storage means; and the means operating when the server is active causes the transmitting means to transmit cells from the storage means associated with a given virtual circuit for a number of intervals no greater than the number of intervals in the virtual circuit subset corresponding to the given virtual circuit.

17. The apparatus set forth in claim 16 wherein:

the at least one server is capable of activating an additional other server;

the size of the subset is fixed at a number of intervals less than the number of intervals of time in the set of intervals of time; and the means operating when the server is active causes the transmitting means to transmit cells from the storage means associated with a given virtual circuit for a number of intervals of time no greater than the number of intervals of time in the virtual circuit subset corresponding to the given virtual circuit, operates to activate the additional other server for any intervals of time remaining in the subset, and operates to activate the other server for the intervals of time remaining in the set of intervals.

18. The apparatus set forth in claim 17 wherein:

the additional other server is also one of the at least one servers.

19. The apparatus set forth in claim 18 wherein:

the sum of the maximum number of intervals of time in each of the entity subsets is less than the number of intervals of time in the subset.

20. The apparatus set forth in claim 13, claim 14, claim 16, claim 17, claim 18, or claim 19 wherein:

the other server is a simple round-robin server.

21. The apparatus set forth in claim 20 wherein:

there is a single simple round robin server.

22. The apparatus set forth in any of claims 13 through 19 wherein:

the storage means is a queue; and the receiving means places each cell in the tail of the queue associated with the virtual circuit which is carrying the cell and the transmitting means transmits cells from the head of the queue.

23. The apparatus set forth in any of claims 13 through 19 wherein:

the set of the intervals of time is periodically repeating.

24. A network for transferring cells of digitized data in virtual circuits operating at controlled rates, the network comprising:

one or more nodes for receiving and transmitting a plurality of the virtual circuits including one or more virtual circuits operating at a controlled rate, each node comprising at least two sets of storage means for storing the cells, each storage means in at least one of the sets of storage means being associated with one of the controlled rate virtual circuits;

receiving means for receiving the cells and placing each cell in the storage means associated with the virtual circuit which is carrying the cell;

transmitting means for transmitting the cells, each cell being transmitted in an interval of time; and a set of at least two servers for causing the transmitting means to transmit cells from the storage means when active, at least one of the servers being capable of activating another server in the set and the at least one server comprising means for associating the set of storage means associated with the controlled rate virtual circuits with the server;

means for associating a periodically repeating set of the intervals of time with the server; and means operating when the server is active to cause the transmitting means to transmit cells from storage means in the associated set of storage means for a subset of the intervals of time and to activate the other server for intervals of time remaining in the set of intervals of time.

25. The network set forth in claim 24 wherein:
the subset is further subdivided into virtual circuit subsets of the intervals, each virtual circuit subset corresponding to a virtual circuit associated with a storage means in the associated set of storage means; and
the means operating when the server is active causes the transmitting means to transmit cells from the storage means associated with a given virtual circuit for a number of intervals of time no greater than the number of intervals of time in the virtual circuit subset corresponding to the given virtual circuit.

26. The network set forth in claim 25 wherein:
the sets of storage means further include an additional set of storage means, each storage means in the additional set being associated with an additional non-controlled rate virtual circuit;
the other server is also one of the at least one servers;
the at least one servers are capable of activating an additional other server which includes means for associating the additional set of storage means with the additional other server and means operating when the additional other server is active to transmit cells from the additional set of storage means;
the size of the subset is fixed at a number of intervals of time less than the number of intervals of time in the set of intervals of time; and
the means operating when the server is active causes the transmitting means to transmit cells from the storage means associated with a given virtual circuit for a number of intervals of time no greater than the number of intervals of time in the virtual circuit subset corresponding to the given virtual circuit, operates to activate the additional other server for any intervals of time remaining in the subset, and operates to activate the other server for the intervals of time remaining in the set of intervals.

27. The network set forth in claim 26 wherein:
the sum of the maximum number of intervals of time in each of the entity subsets is less than the number of intervals of time in the subset.

28. The network set forth in claim 25 wherein:
the nodes include an edge node which couples a source of the cells carried in the rate-controlled virtual circuit to the network and an interior node which carries the rate-controlled virtual circuit but is not connected to the source thereof;
the source provides cells to the virtual circuit such that the source provides a maximum number of cells over a predetermined interval of time, maximum number/predetermined time being less than or equal to the rate of the rate-controlled virtual circuit; and
the storage means associated with the rate-controlled virtual circuit in the edge node is required to store no more than the maximum number of cells, while the storage means associated with the rate-controlled virtual circuit in the interior node is required to store no more cells than a number of cells equal to twice the number of intervals of time in the virtual circuit subset corresponding to the virtual circuit.

29. A method for adjusting the rate of a rate-controlled virtual circuit in a network of the type wherein the rate of the rate-controlled virtual circuit is established by associating the virtual circuit with a subset of one of a set of periodically-repeating sets of intervals of time, the method comprising the steps of:
determining during a longest period belonging to the periodically-repeating sets of intervals of time whether the rate-controlled virtual circuit is using all of the intervals in its subset;
if it is not, determining a size of a new subset and/or a period of the set of intervals of time such that the virtual circuit will use more of the intervals of time in the new subset; and
setting the size of the subset and/or the period of the set as determined at the end of one of the longest periods.

30. A method for setting the rate of a rate controlled virtual circuit to a given rate or adding a rate controlled virtual circuit having the given rate in a network of the type wherein the rate of the rate controlled virtual circuit is established by associating the virtual circuit with a subset of one of a hierarchical set of periodically-repeating sets of intervals of time, the set of intervals of time in each level of the hierarchy but the highest being made up of intervals of time from a subset of the next highest set in the hierarchy, the method comprising the steps of:
beginning with the level at which the virtual circuit is being set or added,
determining whether setting the virtual circuit to the given rate or adding the virtual circuit will increase the total number of intervals of time in the subset such that the number of intervals of time in all of the subsets exceed the number of intervals of time in the set to which the subset belongs;
if either action does, adding at least one interval of time for the set to which the subset belongs to the next higher level of the hierarchy and adjusting the number of intervals of time in the subset for the virtual circuit being added or set until proper rate is reached; and
if adding intervals of time to the subset in the next level of the hierarchy increases the total number of intervals of time in the subset such that the number of intervals in all of the subsets exceed the number of intervals of time in the set to which the subset belongs, repeating steps 1 and 2 for that level and the next higher level.

31. Apparatus for making a time-multiplexed resource available to an entity at a changeable guaranteed average rate, the apparatus comprising:
means for associating pieces of work belonging to the entity with the apparatus;
means for associating a set of the intervals of time with the apparatus;
means for changeably associating a subset of the set of intervals of time with the entity; and
means for repeatedly providing the associated pieces of work to the resource for the set of intervals of time, the number of intervals of time provided for the associated pieces of work in a given one of the repeated set of intervals of time being equal to the current number of the associated pieces of work if that number is less than the number of intervals of time in the subset associated with the entity and otherwise the number of intervals of time in the subset associated with the entity.

32. The apparatus set forth in claim 31 further comprising:

means for associating pieces of work belonging to another entity with the apparatus; and means for providing associated pieces of work belonging to the other entity to the resource for any intervals of time in the given set of intervals of time which are not required to provide the associated pieces of work belonging to the entity to the resource.

33. The apparatus set forth in claim 32 wherein:
the number of intervals of time in the subsets of the set of intervals of time is less than the total number of intervals of time in the set of intervals of time.

34. A method of making a time-multiplexed resource available to an entity at a changeable guaranteed average rate, the method comprising the steps of:
establishing a set of the intervals of time;
associating pieces of work belonging to the entity with the apparatus;
changeably associating a subset of the set of intervals of time with the entity; and
repeatedly providing the associated pieces of work to the resource for the set of intervals of time, the number of intervals of time provided for the associated pieces of work in a given one of the repeated set of intervals of time being equal to the current number of the associated pieces of work if that number is less than the number of intervals of time in the subset associated with the entity and otherwise the number of intervals of time in the subset associated with the entity.

35. The method set forth in claim 34 further comprising the steps of:
associating pieces of work belonging to another entity with the apparatus; and
providing associated pieces of work belonging to the other entity to the resource for any intervals of time in the given set of intervals of time which are not required to provide the associated pieces of work belonging to the entity to the resource.

36. Apparatus for providing a changeable guaranteed average rate of flow of cells of digitized data in one or more virtual circuits, the apparatus comprising:
at least one storage means for storing the cells, each storage means being associated with one of the virtual circuits;
receiving means for receiving the cells and placing each cell in the storage means associated with the virtual circuit which is carrying the cell;
transmitting means for transmitting the cells, each cell being transmitted in an interval of time; and
a server for causing the transmitting means to transmit cells from the storage means, the server comprising
means for associating the storage means with the server;
means for changeably associating a set of the intervals of time with the server;
means for associating a subset of the set of intervals of time with each of the storage means; and
means for repeatedly causing the transmitting means to transmit cells from the associated storage means for the set of intervals of time, the number of the intervals of time in a given one of the repeated sets of intervals of time which are used for cells from a given one of the storage means being the number required to empty the given storage means if that number is less than the number of intervals of time in the subset associated with the given storage means and otherwise the number of intervals of time in the subset associated with the given storage means.

37. The apparatus set forth in claim 36 wherein
the apparatus further controls the flow of digitized data in one or more other virtual circuits; and
the apparatus further comprises:
at least one other storage means for storing the cells, each other storage means being associated with one of the other virtual circuits; and
the means for repeatedly causing the transmitting means to transmit cells further causes the transmitting means to transmit cells from the other storage means for any intervals of time in the set of intervals of time which are not required to transmit cells from the storage means which are not associated with the other virtual circuits.

38. The apparatus set forth in claim 37 wherein:
the number of intervals of time in the subsets of intervals of time is less than the total number of intervals of time in the set of intervals of time.

39. A network for transferring cells of digitized data in virtual circuits operating at changeable guaranteed average rates, the network comprising:
one or more nodes for receiving and transmitting one or more virtual circuits operating at a controlled rate, each node comprising
at least one storage means for storing the cells, each storage means being associated with one of the virtual circuits;
receiving means for receiving the cells and placing each cell in the storage means associated with the virtual circuit which is carrying the cell;
transmitting means for transmitting the cells, each cell being transmitted in an interval of time; and
a server for causing the transmitting means to transmit cells from the storage means, the server comprising
means for associating the storage means with the server;
means for changeably associating a set of the intervals of time with the server;
means for associating a subset of the set of intervals of time with each of the storage means; and
repeatedly causing the transmitting means to transmit cells from the associated storage means for the set of intervals of time, the number of the intervals of time in a given one of the repeated set of intervals of time which are used for cells from a given one of the storage means being the number required to empty the given storage means if that number is less than the number of intervals of time in the subset associated with the given storage means and otherwise the number of intervals of time in the subset associated with the given storage means.

40. The network set forth in claim 39 wherein
the network further transfers cells in other virtual circuits which do not operate at controlled rates; and
the node further comprises:
at least one other storage means for storing the cells, each other storage means being associated with one of the other virtual circuits; and
the means for repeatedly causing the transmitting means to transmit cells further causes the transmitting means to transmit cells from the other storage means for any intervals of time in the set of intervals of time which are not required to transmit cells from the storage means which are not associated with the other virtual circuits.

41. The apparatus set forth in claim 40 wherein:
the number of intervals of time in the subsets of intervals of time is less than the total number of intervals of time in the set of intervals of time.

* * * * *

UNITED STATES PATENT AND TRADEMARK OFFICE
CERTIFICATE OF CORRECTION

PATENT NO. : 5,272,697

DATED : December 21, 1993

INVENTOR(S) : A. G. Fraser, C. R. Kalmanek, S. Keshav

It is certified that error appears in the above-identified patent and that said Letters Patent is hereby corrected as shown below:

Claim 6, Column 18, line 55
"intervals remaining" should read --intervals of time remaining--

Claim 12, Column 19, line 17
"number of intervals in the subset" should read --number of intervals of time in the subset--

Claim 14, Column 19, line 51
"intervals less than" should read --intervals of time less than--

Claim 17, Column 20, line 1
"number of intervals" should read --number of intervals of time--

Claim 25, Column 21, line 5
"intervals" should read --intervals of time--

Claim 26, Column 21, lines 40-41
"set of intervals" should read --set of intervals of time--

UNITED STATES PATENT AND TRADEMARK OFFICE
CERTIFICATE OF CORRECTION

PATENT NO. : 5,272,697
DATED : December 21, 1993
INVENTOR(S) : A.G. Fraser, C.R. Kalmanek, S. Keshav It is certified that error appears in the above-indentified patent and that said Letters Patent is hereby corrected as shown below:

Claim 29, Column 22, line 8

"all of the intervals" should read —all of the intervals of time—.

Signed and Sealed this

Twelfth Day of July, 1994

Attest:

BRUCE LEHMAN

Attesting Officer

Commissioner of Patents and Trademarks